Oct. 1, 1940.  D. D. WITHEM  2,216,716
DISTANCE MEASURING DEVICE
Filed July 1, 1938   2 Sheets-Sheet 1
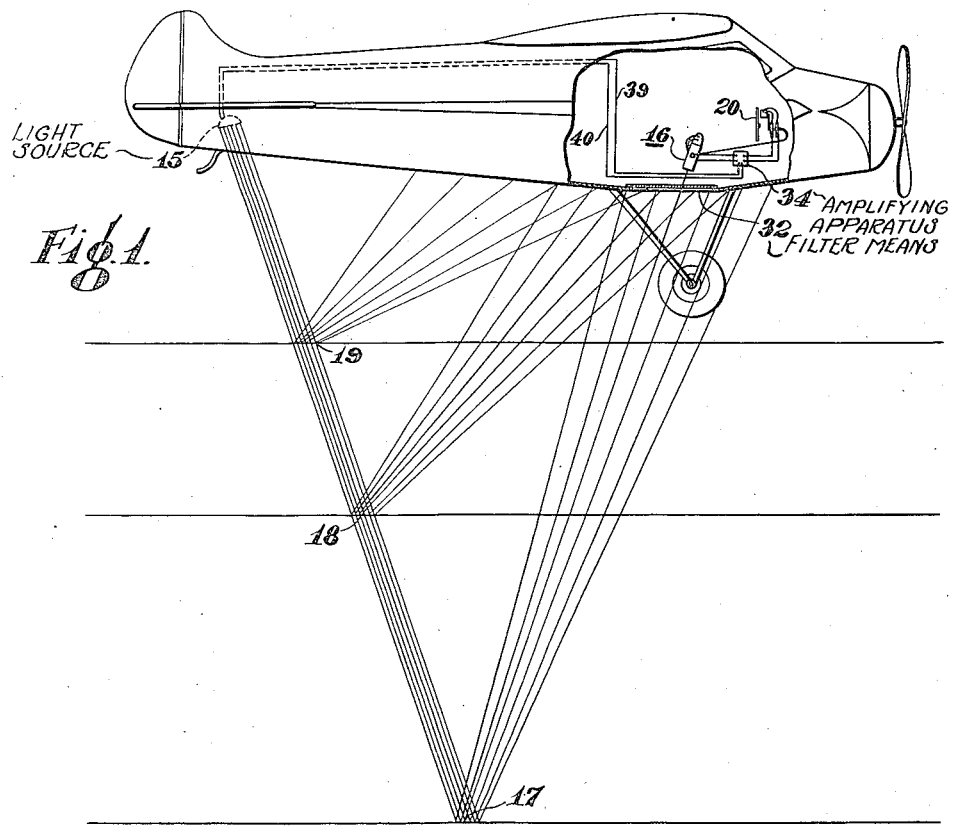
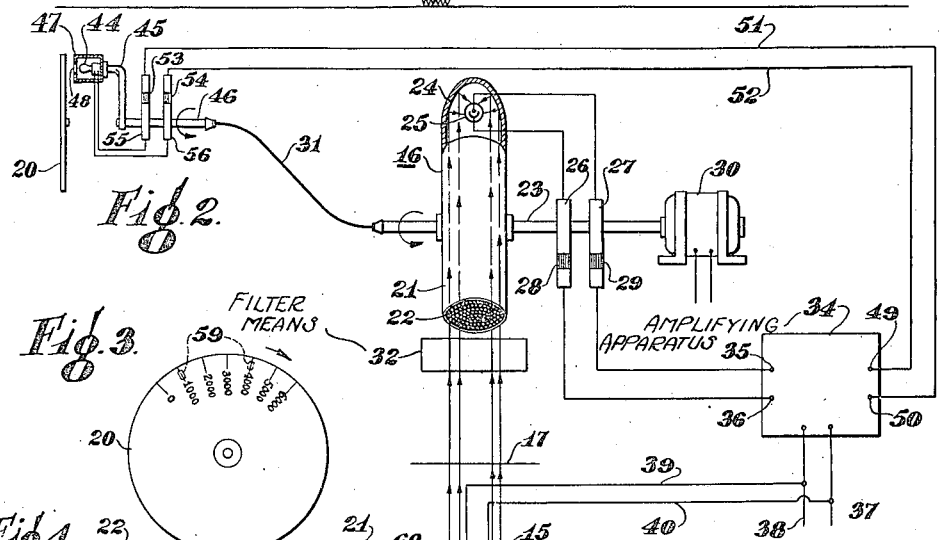
INVENTOR.
Donald Dean Withem
BY
ATTORNEY.

Oct. 1, 1940.     D. D. WITHEM     2,216,716
DISTANCE MEASURING DEVICE
Filed July 1, 1938    2 Sheets-Sheet 2
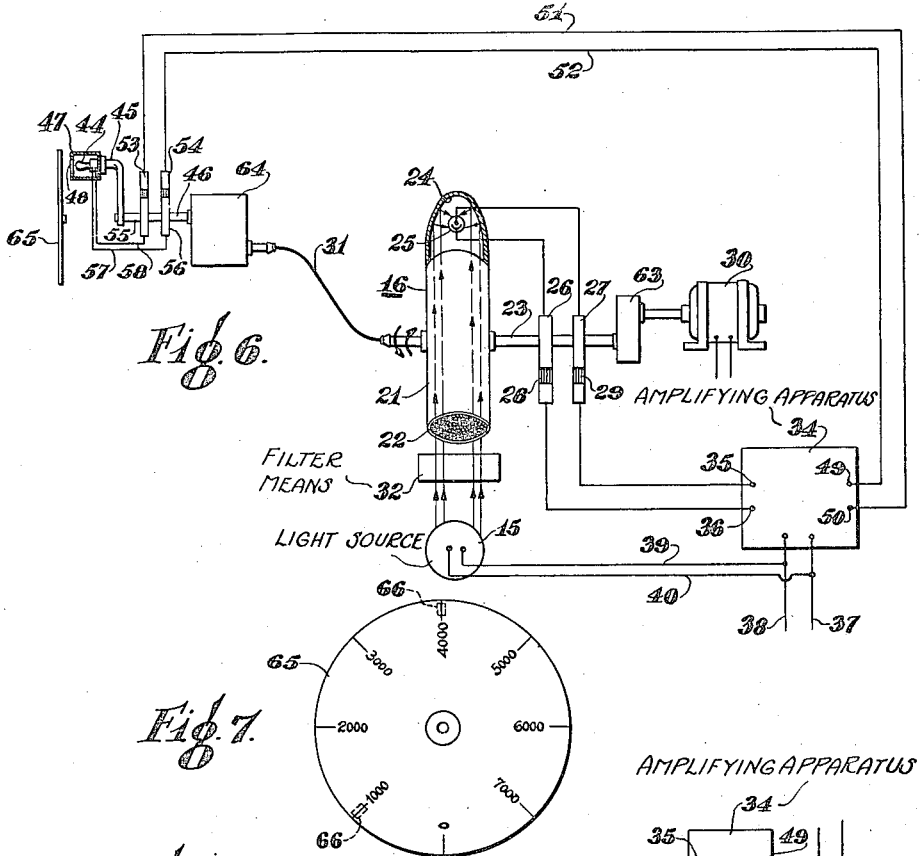
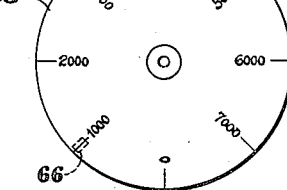
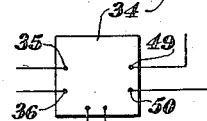
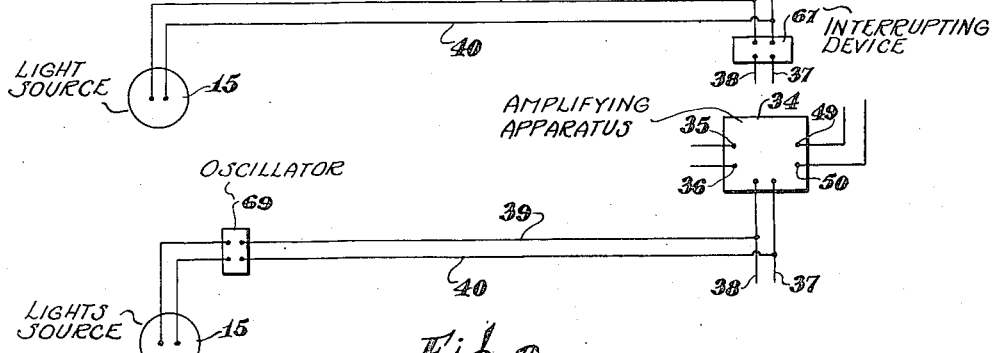
INVENTOR.
Donald Dean Withem
BY Woodling and Krost
ATTORNEY.

Patented Oct. 1, 1940

2,216,716

UNITED STATES PATENT OFFICE 2,216,716

DISTANCE MEASURING DEVICE

Donald Dean Withem, Midland, Pa., assignor of one-half to Irving Kane

Application July 1, 1938, Serial No. 217,106

24 Claims. (Cl. 250—1)

My invention relates to an instrument for determining distance and more particularly to an instrument adapted for use upon aircraft or other devices for determining the elevation above the ground.

In the navigation of aircraft, many disasters have occurred which could have otherwise been avoided had the pilot been provided with an accurate means for determining the exact elevation above the surface of the ground. Altimeters and other elevational measuring means have been provided heretofore but inasmuch as these instruments are responsive to barometric pressure or other atmospheric pressure conditions they only give a relative indication of the altitude above sea level which gives very little help to a pilot when flying over land and mountains which may be several thousand feet above set level.

Therefore, an object of my invention is to provide for accurately measuring the exact elevation of an aircraft or other devices above the ground surface over which it is travelling.

Another object of my invention is to provide for giving a continuous and automatic indication of the exact elevation of an aircraft above the ground to keep pace with the continuous change in the contour of the ground.

Another object of my invention is to give a ready and visible indication of the exact elevation of an aircraft above the ground without any manual manipulation on the part of the pilot.

Another object of my invention is to provide an instrument for determining the exact elevation of an aircraft above the ground, which is independent of weather and fog conditions.

Another object of my invention is to measure the elevation of aircraft above the ground by means of triangulation of spectral energy emanating from the aircraft and reflected from the ground to the aircraft where the angle of reflection is measured to give the elevation.

Another object of my invention is the provision of making the instrument for determining the elevation of aircraft above the ground independent of foreign sources of spectral energy.

Other objects and a fuller understanding of my invention may be had by referring to the following description and claims, taken in combination with the accompanying drawings, in which like parts are designated by like reference characters, and in which:

Figure 1 illustrates an aircraft embodying an instrument for determining the elevation above the ground, in accordance with the principles of my invention;

Figure 2 is a diagrammatic illustration of my invention;

Figure 3 is a front face view of a dial upon which elevations may be indicated and is arranged to be used with arrangement in Figure 2;

Figure 4 shows a front end view of the angularly mounted selective unit in Figure 2;

Figure 5 shows a modified form of a front end view of the angularly mounted selective unit as shown in Figure 4;

Figure 6 shows a diagrammatic illustration of a modified arrangement of my invention;

Figure 7 shows a front face view of a dial upon which elevations may be indicated and is arranged to be used with the arrangement in Figure 6;

Figure 8 shows a fragmentary view of a modification in the electrical circuits of my invention for making my instrument independent of foreign sources of spectral energy; and Figure 9 shows a still further modification of the electrical circuits of my invention for making my instrument independent of sources of spectral energy.

With reference to Figure 1 of the drawings, my invention comprises generally a source of spectral energy 15 mounted upon the rear of the aircraft and an angle measuring device 16 mounted upon the forward end of the aircraft which measures the angle of the spectral energy reflected from the ground surface and which in turn gives the indication of the elevation of the aircraft above the ground.

The source of spectral energy 15 may be an incandescent lamp of which the major portion of the distribution of the spectral energy is within the infra-red range. The arrangement of the light source 15 is such that it produces a slender directive beam of spectral energy to the ground, which is indicated generally by the reference characters 17, 18, and 19 depending upon the elevation, after which a portion of same is reflected through the angle measuring device 16. Since a major portion of the distribution of the spectral energy emanating from the light source 15 is within the infra-red range, my invention is independent of weather and fog conditions because infra-red rays are able to penetrate fog. The distance between the spectral energy producing means 15 and the angle measuring device 16 should be as far apart as possible in order to give a relatively long base for triangulation. Instead of mounting the spectral energy producing means 15 and the angle measuring device 16 as shown in Figure 1 of the drawings, the two devices may be mounted upon opposite ends of the wing or upon any other parts of the aircraft to give a relatively broad base for triangulation. The spectral energy reflected from the ground may be arranged to pass through a filter means 32 before engaging the angle measuring device 16. The filter means may be mounted on the aircraft immediately in advance of the angle measuring device 16 and is arranged to filter out rays within the visible spectrum or any other objectionable parts of the light spectrum.

The angle measuring device 16 is shown diagrammatically in Figure 2 and comprises generally an altitude measuring dial 20 upon which may be indications of the altitude of the craft above the ground, an angularly mounted selective unit 21 through which reflected spectral energy passes before engaging a photo-electric means 25, a motor 30 for angularly moving the selective unit 21, and an amplifying apparatus 34 which amplifies the current produced by the photo-electric means 25 for illuminating a moving lamp 44 positioned in the rear of the altitude measuring dial 20.

The angularly mounted selective unit 21 is arranged to be mounted upon a shaft 23 and continuously rotated by the motor 30, as for example, in a counter-clockwise direction as indicated by the arrows. The plane of rotation of the selective unit 21 is substantially in alignment with the source of spectral energy 15, so that reflected rays may strike the selective unit. The forward cylindrical part of the selective unit 21 is open and is provided with a plurality of alignment means 22 which may be in the form of longitudinal tubes suitably secured within the cylindrical housing of the selective unit. The internal surface of the rear of the housing of the selective unit 21 terminates in a parabolic reflecting mirror 24 for directing the rays which pass through the alignment means 22 upon the photo-electric means 25, as indicated by the arrow lines. The mirror surface 24 may be polished metal or any other suitable reflective surface for directing the spectral energy reflected from the earth upon the photo-electric means 25. The longitudinal alignment means 22 may be in the form of longitudinal tubes, relatively small in diameter and relatively long in length in order to give a high degree of accuracy to the measurement of the angle of the spectral energy reflected from the ground. Instead of using round tubes as shown in Figures 2 and 4, the alignment means 22 may be in the form of small square or rectangular openings 60 as shown in Figure 5, or of any other suitable shape. The selective unit 21 may be mounted upon the shaft 23 in any suitable manner and may be arranged such that it is preferably balanced thereon, but may be off center.

The photo-electric means 25 is positioned substantially at the focus of parabolic mirror 24 so as to receive the spectral energy reflected from the earth at a concentrated point. As the selective unit 21 is continuously rotated by the motor 30, spectral energy reflected from the ground passes through the alignment means 22 and engages the photo-electric means 25, upon each revolution of the selective unit when the alignment means 22 is in substantial alignment position with the directive beams of reflected spectral energy. Thus, the alignment means 22 permits the reflected beam of spectral energy to pass therethrough and intermittently engage the photo-electric means. The intermittent striking of the photo-electric means 25 by the reflected spectral energy passing through the alignment means 22 causes the photo-electric means to produce an intermittent electric current which is arranged to intermittently energize the moving light means 44 through the amplifier 34. The intermittent current generated by the photo-electric means 25 may be carried to the terminals 35 and 36 of the amplifying device 34 through means of slip rings 26 and 27 mounted upon the shaft 23, and a pair of brushes 28 and 29 which respectively engage the slip rings 26 and 27.

The moving light means 44 is arranged to rotate in a circle immediately in rear of the altitude measuring dial 20. Any suitable means of moving the movable light means 44 may be employed and as illustrated in Figure 2, I employ a crank 45 that is mounted to a suitable shaft 46 which is in turn driven by means of a flexible cable 31 from the shaft 23 driven by the motor 30. Accordingly, the movable light means 44 is driven synchronously with the selective unit 21. Surrounding the moving light means 44 is a housing 47 having a slot 48 so that a localized beam of light is cast upon the rear face of the altitude measuring dial 20, which may be constructed of any suitable translucent material and display a localized illuminated spot on the face of the dial. The movable light means 44 may be energized by the output terminals 49 and 50 of the amplifier 34 through means of conductors 51 and 52 which are connected to a pair of brushes 53 and 54 which slidably engage rings 55 and 56 mounted upon the rotating shaft 46 that drives the movable lamp 44. The spectral energy producing means 15 may be energized from the supply conductors 37 and 38 through conductors 39 and 40. The supply conductors also energize the amplifying apparatus 34.

With the foregoing arrangement, when the selective unit 21 is at a particular angle during its rotations, spectral energy reflected from the ground passes therethrough and strikes the photo-electric means 25 and causes an interrupted current to be generated therein which flows to the amplifier after which the amplified current intermittently energizes the moving light means 44 which is synchronously rotating in the rear of the translucent dial 20 upon which elevations of the aircraft above the ground are calibrated. Thus, for example, if the moving light means 44 should become energized when it is directly in rear of "1000" feet then this is an indication that the aircraft is 1000 feet above the ground. Similarly if the moving light means 44 becomes energized when it is in rear of "4000" feet as calibrated on the dial 20, then it is an indication that the aircraft is 4000 feet above the ground. It is preferable that the moving light means 44 be of a suitable gaseous type so that it has no time lag to cause an error in the reading of the elevation. If the selective unit 21 is rotated at a very high speed, such for example, above 16 revolutions per second, the movable light means 44 will appear to the eye as being continuously energized and will move in synchronism with the rotation of the selective unit 21 to give an appearance of a movable illuminated localized spot, as indicated by the reference character 59 in Figure 3, upon the translucent dial or screen 20 which gives a continuous reading of the elevation of the aircraft above the ground.

As shown in Figure 1, the position of the spectral energy producing means 15 is preferably arranged, although not limited thereto, such that a slender directive beam of spectral energy engages the ground substantially midway between the spectral energy producing means 15 and the angle measuring device 16 when the aircraft is at its maximum elevation. At the maximum elevation, the reflected spectral energy will be most highly concentrated upon the measuring device 16. That is to say, the angle measuring device 16 will be substantially in the middle of the distribution of the reflected spectral energy at the maximum altitude and affords a maximum opportunity for the reflected spectral energy to strike the angle measuring device at the weakest penetration. At lower altitudes, such for example, as indicated by the reference characters 18 and 19, the angle measuring device 16, will not be in the center of the distributed reflected spectral energy, but will be off to one side or to the edge of the distribution of the reflected spectral energy. At lower altitude the penetration is the greatest, and spectral energy reflected from the ground need not concentrate upon the angle measuring device, and rays off to one edge of the distribution are available to pass through the selective unit 21 and intermittently energize the photo-electric means 25. The selective unit 21 measures the angle at which the spectral energy reflected from the earth engages the photo-electric means 25. In Figure 1, the selective unit 21 at the maximum altitude measures the angle 15—16—37. The angle 16—15—17 is known, as this depends upon the angle the slender directive beams is directed to the ground, which may be any suitable angle so long as a reflected ray may strike the angle measuring device 16. Also, the distance between the source of spectral energy 15 and the angle measuring device 16 is known. Therefore, when two angles and an included side of a triangle are known, the height of the triangle, that is the distance of the aircraft above the ground, may be mathematically calculated or evaluated by my angle measuring device 16 to give the height of the airplane above the ground. The fact that the aircraft inclines upwardly while ascending or inclines downwardly while descending has substantially no effect upon the reading of the elevation by my invention, because the principle of triangulation still holds regardless of whether the base of the triangle between the spectral energy producing means 15 and the angle measuring device 16 is inclined with respect to the ground surface. This is true for the reason that my invention does not depend upon receiving the reflected spectral energy at its highest intensity but is operative so long as a single beam of reflected light engages the angle measuring device 16 regardless of whether the single beam of reflected spectral energy is off to one side of the point of highest reflected intensity.

The dial 20 upon which altitudes are indicated may be first determined by mathematical calculations and later verified by experiment. The dial 20 is arranged to face the pilot for easy reading and the synchronously driven and synchronously energized light means 44 shows the elevation of the aircraft above the earth and keeps pace with the continuous change in the contour of the ground.

In Figure 6, I show a modification of my invention, in which like parts are designated by like reference characters to those shown in Figure 2. In Figure 6, the selective unit 21 is oscillated through an angle of approximately 90 degrees by means of a gear oscillator 63 which is mounted between the motor 30 and the shaft 23. As the motor continuously runs in one direction, the selective unit 21 is oscillated through an angle of substantially 90 degrees as indicated by the arrow lines about the shaft 23. Instead of connecting the flexible cable 31 directly to the shaft 46 which operates the movable light means 44, I employ a speed increaser 64 which steps up the speed of the moving light means 44 to four times its value, if it were connected directly to the oscillating shaft 23. By stepping up the speed of the movement of the movable light means 44 to four times its value, the dial 65 which is placed immediately in front of the movable light means 44 may be calibrated into a complete circle as shown in Figure 7, instead of a 90 degree as shown in Figure 3. Each time that the selective unit 21 in Figure 6 is oscillated, it passes through the alignment position twice and permits spectral energy to strike the photo-electric means 25 two times for each oscillation. The electrical operation of the device in Figure 6 is the same as that described with respect to Figure 2, and if the movable light means 44 should become energized when it is directly in rear of "1000" feet as shown by the illuminated spot 66 in Figure 7, then this is an indication that the aircraft is 1000 feet above the ground. Similarly, if the moving light means 44 becomes energized in rear of "4000" feet as shown in Figure 7 as calibrated upon the dial 65, then it is an indication that the aircraft is 4000 feet above the ground. For convenience, the elevational units on the dials in Figures 3 and 7 have been indicated as being uniform, but in actual calibration the units will not be uniform but will be condensed at the higher elevations.

Inasmuch as the directive beams which emanated from the light source 15 are slender, my invention is substantially free from foreign light sources, which might tend to momentarily destroy a true reading of my device. Before my device could respond to a foreign light source, it would be necessary that the aircraft fly directly over the light source so that the light could pass through the selective means and strike the photo-electric means 25.

However, in order to avoid all possible interference from foreign light sources, I provide in Figure 8 an interrupting device 67 which interrupts the flow of the current energizing the spectral energy producing means 15 and the amplifying apparatus 34. In this arrangement, the current may be arranged to be "on" for very short periods and "off" for longer periods. Thus, for example, the circuit might be energized for one-tenth of a second and de-energized for nine-tenths of a second. Therefore, in order that my device be responsive to foreign light, it would be necessary that the aircraft be directly over the light at the same time that the circuit is energized. Since the occurrence of these two conditions would be extremely remote, my invention is substantially free of inaccurate readings resulting from foreign light sources.

In Figure 9, I show another embodiment of my electrical circuits which prevent my system from being influenced from foreign light sources and here I employ an oscillator 69 which energized the source of spectral energy 15 at a frequency determined by the tuning of the oscillator. In this arrangement, the amplifier 34 is also tuned to the same frequency as that of the oscillator 69 and the light source at 15 should be of a suitable gaseous tube or other device which has no time lag in order that the light oscillations be kept distinct and cause the reflected rays to synchronize with the tuned amplifier 34.

The sensitivity of my altimeter depends on the following factors:

*First factor.*—The beam candle power of the source of light at 16.

*Second factor.*—The frequency of the light beam. Different frequencies of light are easier to transmit through a medium than others and affect the photo-electric means 25 differently than others.

*Third factor.*—The medium of transmission. For example, a smaller precentage of light is transmitted through fog, snow, rain, and humidity in atmosphere than through a clear dry atmosphere.

*Fourth factor.*—The reflecting power of the earth. This will vary from place to place.

*Fifth factor.*—The area of cross-section of the selective unit 21 and the mirror unit. The larger the area, the greater is the sensitivity.

*Sixth factor.*—The sensitivity of the amplifier. The greater the sensitivity of the amplifier, the greater the sensitivity of the altimeter.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A device to be used on aircraft or other devices to determine the distance between the same and a reflecting surface comprising, in combination, means mounted on the aircraft or other devices for producing a slender directive beam of spectral energy and for directing same toward the reflecting surface, photo-electric means mounted on the aircraft or other devices at a distance from the spectral energy producing means and responsive to spectral energy reflected from the reflecting surface, angularly mounted selective means positioned in advance of the photo-electric means and constituting alignment means through which directive beams of reflected spectral energy may pass and engage the photo-electric means when the alignment means is in substantial alignment position with said directive beams of reflected spectral energy, means for angularly moving the selective means and causing same to move repeatedly through the alignment position and admit said directive beams of reflected spectral energy intermittently upon the photo-electric means, movable light means, means for synchronously moving the movable light means and the selective means, amplifying means governed by the photo-electric means for intermittently energizing the movable light means, dial means calibrated to indicate the distance between the aircraft or other devices and the reflecting surface, and means for causing the movable light means to cast its intermittent beam in a localized space upon the dial means to give an indication of said measured distance.

2. A device to be used on aircraft or other devices to determine the distance between the same and a reflecting surface comprising, in combination, means mounted on the aircraft or other devices for producing a slender directive beam of spectral energy and for directing same toward the reflecting surface, angularly mounted selective means having alignment means through which directive beams of reflected spectral energy may pass when the alignment means is in substantial alignment position with said directive beams of reflected spectral energy, means for mounting the selective means on the aircraft or other devices at a distance from the spectral energy producing means, photo-electric means mounted on the selective means in rear of the alignment means and responsive to the spectral energy reflected from the reflecting surface and passing through the alignment means, means for angularly moving the selective means and causing same to move repeatedly through the alignment position and admit said directive beams of reflected spectral energy intermittently upon the photo-electric means, movable light means, means for synchronously moving the movable light means and the selective means, amplifying means governed by the photo-electric means for intermittently energizing the movable light means, dial means calibrated to indicate the distance between the aircraft or other devices and the reflecting surface, and means for causing the movable light means to cast its intermittent beam in a localized space upon the dial means to give an indication of said measured distance.

3. A device to be used on aircraft or other devices to determine the distance between the same and a reflecting surface comprising, in combination, means mounted on the aircraft or other devices for producing a slender directive beam of spectral energy and for directing same toward the reflecting surface, angularly mounted selective means having alignment means through which directive beams of reflected spectral energy may pass when the alignment means is in substantial alignment position with said directive beams of reflected spectral energy, means for mounting the selective means on the aircraft or other devices at a distance from the spectral energy producing means, photo-electric means mounted on the selective means in rear of the alignment means and responsive to the spectral energy reflected from the reflecting surface and passing through the alignment means, means for rotating the selective means in one direction and causing same to move repeatedly through the alignment position and admit said directive beams of reflected spectral energy intermittently upon the photo-electric means, movable light means, means for synchronously moving the movable light means and the selective means, amplifying means governed by the photo-electric means for intermittently energizing the movable light means, dial means calibrated to indicate the distance between the aircraft or other devices and the reflecting surface, and means for causing the movable light means to cast its intermittent beam in a localized space upon the dial means to give an indication of said measured distance.

4. A device to be used on aircraft or other devices to determine the distance between the same and a reflecting surface comprising, in combination, means mounted on the aircraft or other devices for producing a slender directive beam of spectral energy and for directing same toward the reflecting surface, angularly mounted selective means having alignment means through which directive beams of reflected spectral energy may pass when the alignment means is in substantial alignment position with said directive beams of reflected spectral energy, means for mounting the selective means on the aircraft or other devices at a distance from the spectral energy producing means, photo-electric means mounted on the selective means in rear of the alignment means and responsive to the spectral energy reflected from the reflecting surface and passing through the alignment means, means for oscillating the selective means and causing same to move repeatedly through the alignment position and admit said directive beams of reflected spectral energy intermittently upon the photo-electric means, movable light means, means for synchronously moving the movable light means and the selective means, amplifying means governed by the photo-electric means for intermittently energizing the movable light means, dial means calibrated to indicate the distance between the aircraft or other devices and the reflecting surface, and means for causing the movable light means to cast its intermittent beam in a localized space upon the dial means to give an indication of said measured distance.

5. A device to be used on aircraft or other devices to determine the distance between the same and a reflecting surface comprising, in combination, means mounted on the aircraft or other devices for producing a slender directive beam of spectral energy and for directing same toward the reflecting surface, angularly mounted selective means having alignment means through which directive beams of reflected spectral energy may pass when the alignment means is in substantial alignment position with said directive beams of reflected spectral energy, means for mounting the selective means on the aircraft or other devices at a distance from the spectral energy producing means, photo-electric means mounted on the selective means in rear of the alignment means and responsive to the spectral energy reflected from the reflecting surface and passing through the alignment means, and causing same to move repeatedly through the alignment position and admit said directive beams of reflected spectral energy intermittently upon the photo-electric means, movable light means, means for synchronously moving the movable light means and the selective means, means for causing the movable light means to move through a greater oscillatory angle than the selective means, amplifying means governed by the photo-electric means for intermittently energizing the movable light means, dial means calibrated to indicate the distance between the aircraft or other devices and the reflecting surface, and means for causing the movable light means to cast its intermittent beam in a localized space upon the dial means to give an indication of said measured distance.

6. A device to be used on aircraft or other devices to determine the distance between the same and a reflecting surface comprising, in combination, means mounted on the aircraft or other devices for producing a slender directive beam of spectral energy and for directing same toward the reflecting surface, angularly mounted selective means having alignment means through which directive beams of reflected spectral energy may pass when the alignment means is in substantial alignment position with said directive beams of reflected spectral energy, means for mounting the selective means on the aircraft or other devices at a distance from the spectral energy producing means, photo-electric means mounted on the selective means in rear of the alignment means and responsive to the spectral energy reflected from the reflecting surface and passing through the alignment means, mirror means mounted on the selective means in rear of the photoelectric means for directing the spectral energy which passes through the alignment means upon the photoelectric means, means for angularly moving the selective means, and causing same to move repeatedly through the alignment position and admit said directive beams of reflected spectral energy intermittently upon the photo-electric means, movable light means, means for synchronously moving the movable light means and the selective means, amplifying means governed by the photo-electric means for intermittently energizing the movable light means, dial means calibrated to indicate the distance between the aircraft or other devices and the reflecting surface, and means for causing the movable light means to cast its intermittent beam in a localized space upon the dial means to an indication of said measured distance.

7. A device to be used on aircraft or other devices to determine the distance between the same and a reflecting surface comprising, in combination, means mounted on the aircraft or other devices for producing a slender directive beam of spectral energy and for directing same toward the reflecting surface, photo-electric means mounted on the aircraft or other devices at a distance from the spectral energy producing means and responsive to spectral energy reflected from the reflecting surface, angularly mounted selective means positioned in advance of the photo-electric means and constituting alignment means through which directive beams of reflected spectral energy may pass and engage the photo-electric means when the alignment means is in substantial alignment position with said directive beams of reflected spectral energy, filter means mounted on the aircraft or other devices and positioned between the spectral energy producing means and the selective means to confine the spectral energy engaging the photo-electric means to substantially the infra red range, means for angularly moving the selective means and causing same to move repeatedly through the alignment position and admit said directive beams of reflected spectral energy intermittently upon the photo-electric means, movable light means, means for synchronously moving the movable light means and the selective means, amplifying means governed by the photo-electric means for intermittently energizing the movable light means, dial means calibrated to indicate the distance between the aircraft or other devices and the reflecting surface, and means for causing the movable light means to cast its intermittent beam in a localized space upon the dial means to give an indication of said measured distance.

8. A device to be used on aircraft or other devices to determine the distance between the same and a reflecting surface comprising, in combination, means mounted on the aircraft or other devices for producing a slender directive beam of spectral energy and for directing same toward the reflecting surface, angularly mounted selective means having alignment means through which directive beams of reflected spectral energy may pass when the alignment means is in substantial alignment position with said directive beams of reflected spectral energy, means for mounting the selective means on the aircraft or other devices at a distance from the spectral energy producing means, photo-electric means mounted on the selective means in rear of the alignment means and responsive to the spectral energy reflected from the reflecting surface and passing through the alignment means when in the alignment position, means for angularly moving the selective means in the alignment position and causing same to admit said directive beams of reflected spectral energy upon the photo-electric means, and means responsive to the alignment position of the selective means and the photo-electric means to indicate the distance between the aircraft or other devices and the reflecting surface.

9. A device to be used on aircraft or other devices to determine the distance between the same and a reflecting surface comprising, in combination, means mounted on the aircraft or other devices for producing a slender directive beam of spectral energy and for directing same toward the reflecting surface, angularly mounted selective means having alignment means through which directive beams of reflected spectral energy may pass when the alignment means is in substantial alignment position with said directive beams of reflected spectral energy, means for mounting the selective means on the aircraft or other devices at a distance from the spectral energy producing means, photo-electric means mounted on the selective means in rear of the alignment means and responsive to the spectral energy reflected from the reflecting surface and passing through the alignment means when in the alignment position, means for angularly moving the selective means in the alignment position and causing same to admit said directive beams of reflected spectral energy upon the photo-electric means, and means responsive to the alignment position of the selective means to indicate the distance between the aircraft or other devices and the reflecting surface.

10. A device to be used on aircraft or other devices to determine the distance between the same and a reflecting surface comprising, in combination, means mounted on the aircraft or other devices for producing a slender directive beam of spectral energy and for directing same toward the reflecting surface, angularly mounted selective means having alignment means through which directive beams of reflected spectral energy may pass when the alignment means is in substantial alignment position with said directive beams of reflected spectral energy, means for mounting the selective means on the aircraft or other devices at a distance from the spectral energy producing means, photo-electric means mounted on the selective means in rear of the alignment means and responsive to the spectral energy reflected from the reflecting surface and passing through the alignment means, means for angularly moving the selective means and causing same to move repeatedly through the alignment position and admit said directive beams of reflected spectral energy intermittently upon the photo-electric means, movable light means, means for synchronously moving the movable light means and the selective means, amplifying means governed by the photo-electric means for intermittently energizing the movable light means, means for intermittently energizing the spectral energy producing means and the amplifying means to minimize the effect from foreign beams of spectral energy, dial means calibrated to indicate the distance between the aircraft or other devices and the reflecting surface, and means for causing the movable light means to cast its intermittent beam in a localized space upon the dial means to give an indication of said measured distance.

11. A device to be used on aircraft or other devices to determine the distance between the same and a reflecting surface comprising, in combination, means mounted on the aircraft or other devices for producing a slender directive beam of spectral energy and for directing same toward the reflecting surface, angularly mounted selective means having alignment means through which directive beams of reflected spectral energy may pass when the alignment means is in substantial alignment position with said directive beams of reflected spectral energy, means for mounting the selective means on the aircraft or other devices at a distance from the spectral energy producing means, photo-electric means mounted on the selective means in rear of the alignment means and responsive to the spectral energy reflected from the reflecting surface and passing through the alignment means, means for angularly moving the selective means and causing same to move repeatedly through the alignment position and admit said directive beams of reflected spectral energy intermittently upon the photo-electric means, movable light means, means for synchronously moving the movable light means and the selective means, oscillator means tuned to a relatively high frequency for energizing the spectral energy producing means to minimize the effect from foreign beams of spectral energy, amplifying means tuned to substantially the same frequency as the oscillator means and governed by the photo-electric means for intermittently energizing the movable light means, dial means calibrated to indicate the distance between the aircraft or other devices and the reflecting surface, and means for causing the movable light means to cast its intermittent beam in a localized space upon the dial means to give an indication of said measured distance.

12. A device to be used on aircraft or other devices to determine the distance between the same and a reflecting surface comprising, in combination, means mounted on the aircraft or other devices for producing a slender directive beam of spectral energy and for directing same toward the reflecting surface, photo-electric means mounted on the aircraft or other devices at a distance from the spectral energy producing means and responsive to spectral energy reflected from the reflecting surface, movable angle measuring means including selective means mounted on the aircraft or other devices for measuring the angle at which spectral energy reflected from the reflecting surface and selected by the selective means is directed toward the photo-electric means, means for recurrently moving the movable angle measuring means and the photo-electric means and causing same to recurrently intercept the spectral energy reflected from the reflected surface, and means responsive to the photo-electric means and the movable angle measuring means to indicate the distance between the aircraft or other devices and the reflecting surface.

13. A device to be used on aircraft or other devices to determine the distance between the same and a reflecting surface comprising, in combination, means mounted on the aircraft or other devices for producing a slender directive beam of spectral energy and for directing same toward the reflecting surface, photo-electric means mounted on the aircraft or other devices at a distance from the spectral energy producing means and responsive to spectral energy reflected from the reflecting surface, movable angle measuring means including selective means mounted on the aircraft or other devices for repeatedly measuring the angle at which spectral energy reflected from the reflecting surface and selected by the selective means is directed toward the photo-electric means, means for recurrently moving the movable angle measuring means and the photo-electric means and causing same to recurrently intercept the spectral energy reflected from the reflected surface, and means responsive to the photo-electric means and the movable angle measuring means to indicate the distance between the aircraft or other devices and the reflecting surface.

14. A device to be used on aircraft or other devices to determine the distance between the same and a reflecting surface comprising, in combination, means mounted on the aircraft or other devices for producing a slender directive beam of spectral energy and for directing same toward the reflecting surface, movable angle measuring means including selective means and photo-electric means mounted on the aircraft or other devices at a distance from the spectral energy producing means and responsive to spectral energy reflected from the reflecting surface and selected by the selective means, means for recurrently moving the movable angle measuring means and the photo-electric means and causing same to recurrently intercept the spectral energy reflected from the reflected surface, and means responsive to the photo-electric means and the movable angle measuring means for measuring the distance between the aircraft or other devices and the reflecting surface.

15. A device to be used on aircraft or other devices to determine the distance between the same and a reflecting surface comprising, in combination, means mounted on the aircraft or other devices for producing a slender directive beam of spectral energy and for directing same toward the reflecting surface, movable angle measuring means including selective means and photo-electric means mounted on the aircraft or other devices at a distance from the spectral energy producing means and responsive to spectral energy reflected from the reflecting surface and selected by the selective means, means for recurrently moving the movable angle measuring means and the photo-electric means and causing same to recurrently intercept the spectral energy reflected from the reflected surface, and means responsive to the photo-electric means and the movable angle measuring means for measuring the distance between the aircraft or other devices and the reflecting surface, filter means mounted on the aircraft or other devices and positioned between the spectral energy producing means and the measuring means to confine the spectral energy engaging the photo-electric means to substantially the infra red range.

16. In combination, photo-electric means, spectral energy producing means influencing the photo-electric means, angularly mounted selective means having alignment means through which spectral energy may pass and engage the photo-electric means when the alignment means is in substantial alignment position with said spectral energy, means for angularly and recurrently moving the selective means and causing same to move repeatedly through the alignment position and admit said spectral energy intermittently upon the photo-electric means, and means responsive to the selective means and the photo-electric means to measure the angle at which the spectral energy is directed toward the photo-electric means.

17. In combination, photo-electric means, spectral energy producing means influencing the photo-electric means, angularly mounted selective means having alignment means through which spectral energy may pass and engage the photo-electric means when the alignment means is in substantial alignment position with said spectral energy, means for angularly moving the selective means and causing same to admit said spectral energy upon the photo-electric means, and means for synchronizing the movement of the selective means and the response of the photo-electric means to measure the angle at which the spectral energy is directed toward the photo-electric means.

18. A device to be used on aircraft or other devices to determine the distance between the same and a reflecting surface comprising, in combination, means mounted on the aircraft or other devices for producing a slender directive beam of spectral energy and for directing same toward the reflecting surface, light sensitive means mounted on the aircraft or other devices at a distance from the spectral energy producing means and responsive to spectral energy reflected from the reflecting surface, movable angle measuring means including selective means mounted on the aircraft or other devices for measuring the angle at which spectral energy reflected from the reflecting surface and selected by the selective means is directed toward the light sensitive means, means for recurrently moving the movable angle measuring means and the photo-electric means and causing same to recurrently intercept the spectral energy reflected from the reflected surface, and means responsive to the photo-electric means and the movable angle measuring means to indicate the distance between the aircraft or other devices and the reflecting surface.

19. A device to be used on aircraft or other devices to determine the distance between the same and a reflecting surface comprising, in combination, means mounted on the aircraft or other devices for producing a slender directive beam of spectral energy and for directing same toward the reflecting surface, light sensitive means mounted on the aircraft or other devices at a distance from the spectral energy producing means and responsive to spectral energy reflected beams from the reflecting surface, movable selective means mounted on the aircraft or other devices and positioned to intercept the reflected spectral energy beams to govern the selection of reflected beams for influencing the light sensitive means, means for recurrently moving the movable selective means and causing same to recurrently intercept the spectral energy reflected beams from the reflected surface, and means responsive to the light sensitive means and the movable selective means to indicate the distance between the aircraft or other devices and the reflecting surface.

20. A device to be used on aircraft or other devices to determine the distance between the same and a reflecting surface comprising, in combination, means mounted on the aircraft or other devices for producing energy waves and for directing same toward the reflecting surface, electrical responsive means mounted on the aircraft or other devices at a distance from the energy producing device and responsive to reflected energy from the reflecting surface, a movable directional receiver mounted on the aircraft or other devices and positioned to intercept the reflected energy from the reflecting surface, means for recurrently moving the directional receiver and causing same to recurrently intercept reflected energy from the reflecting surface for influencing the electrical responsive means, and means responsive to the electrical responsive means and the directional receiver to indicate the distance between the aircraft or other devices and the reflecting surface.

21. A device to be used on aircraft or other devices to determine the distance between the same and a reflecting surface comprising, in combination, means mounted on the aircraft or other devices for producing energy waves and for directing same toward the reflecting surface, selective means including a movable directional receiver mounted on the aircraft or other devices at a distance from the energy producing device for selecting certain of the reflected energy from the reflecting surface, electrical responsive means influenced by the selected energy, means for recurrently moving the movable directional receiver and causing same to recurrently intercept reflected energy, and maens responsive to the electrical responsive means and the movable directional receiver to indicate the distance between the aircraft or other devices and the reflecting surface.

22. A device to be used on aircraft or other devices to determine the distance between the same and a reflecting surface comprising, in combination, means mounted on the aircraft or other devices for producing energy waves and for directing same toward the reflecting surface, a movable directional receiver mounted on the aircraft or other devices at a distance from the energy producing device and arranged to recurrently move in the field of the reflected energy, means for recurrently moving the movable directional receiver, electrical responsive means influenced by the energy received by the movable directional receiver means, and means responsive to the electrical responsive means and the movable directional receiver to indicate the distance between the aircraft or other devices and the reflecting surface.

23. A device to be used an aircraft or other devices to determine the distance between the same and a reflecting surface comprising, in combination, means mounted on the aircraft or other devices for producing energy waves and for directing same toward the reflecting surface, a movable directional receiver mounted on the aircraft or other devices at a distance from the energy producing device and arranged to recurrently move in the field of the reflected energy, means for recurrently moving the movable directional receiver, electrical responsive means influenced by the energy received by the movable directional receiver means, said movable directional receiver and the electrical responsive means selecting certain of the reflected energy, means for indicating the position of the movable directional receiver when said certain of the reflected energy is being selected to give a measurement of the distance between the aircraft or other devices and the reflecting surface.

24. A device to be used on aircraft or other devices to determine the distance between the same and a reflecting surface comprising, in combination, means mounted on the aircraft or other devices for producing energy waves and for directing same toward the reflecting surface, a movable directional receiver mounted on the aircraft or other devices at a distance from the energy producing device and arranged to recurrently move in the field of the reflected energy, means for recurrently moving the movable directional receiver, electrical responsive means influenced by the energy received by the movable directional receiver means, said movable directional receiver and the electrical responsive means selecting certain of the reflected energy, light means responsive to the electrical responsive means, movable measurement means carrying the light means and responsive to the movements of the movable directional receiver, and dial means registering with the light means and the movable measurement means for indicating a measurement of the distance between the aircraft or other devices and the reflecting surface.

DONALD DEAN WITHEM.